United States Patent
Bonfrate et al.

(10) Patent No.: US 6,751,386 B2
(45) Date of Patent: Jun. 15, 2004

(54) PERIODIC OPTICAL POLING OF WAVEGUIDES FOR QUASI PHASE MATCHING

(75) Inventors: Gabriele Bonfrate, Southampton (GB); Petr Georgevich Kazansky, Southampton (GB); Valerio Pruneri, Southampton (GB)

(73) Assignee: University of Southhampton, Hampshire (GB)

( * ) Notice: Subject to any disclaimer, the term of this patent is extended or adjusted under 35 U.S.C. 154(b) by 0 days.

(21) Appl. No.: 10/051,052

(22) Filed: Jan. 22, 2002

(65) Prior Publication Data

US 2002/0150363 A1 Oct. 17, 2002

Related U.S. Application Data

(63) Continuation of application No. PCT/GB00/02839, filed on Jul. 21, 2000.

(30) Foreign Application Priority Data

Jul. 21, 1999 (GB) .............................................. 9917138

(51) Int. Cl.[7] ................................................. G02B 6/00
(52) U.S. Cl. ......................................... 385/122; 385/37
(58) Field of Search .................... 385/37, 122; 430/290

(56) References Cited

U.S. PATENT DOCUMENTS

| | | | |
|---|---|---|---|
| 5,247,601 A | 9/1993 | Myers et al. | 385/122 |
| 5,617,499 A | 4/1997 | Brueck et al. | 385/122 |
| 6,246,815 B1 * | 6/2001 | Fujiwara et al. | 385/37 |
| 6,400,868 B1 * | 6/2002 | Riant et al. | 385/37 |

FOREIGN PATENT DOCUMENTS

| | | |
|---|---|---|
| WO | WO 96/16344 | 5/1996 |
| WO | WO98/07064 | 2/1998 |

OTHER PUBLICATIONS

Dell, J.M., "Erasure of Poling Induced Second Order Optical Nonlinearities in Silica by UV Exposure", SPIE vol. 2289 Doped Fiber Devices and Systems, pp. 185–193, (1994).

Kazansky, P. G. et al., "Blue–Light Generation By Quasi–Phase–Matched Frequency Doubling in Thermally Poled Optical Fibers", Optics Letters, vol. 20, No. 8, pp. 843–845, (Apr. 15, 1995).

Myers, R. A. et al., "Large Second–Order Nonlinearity in Poled Fused Silica", Optics Letters, vol. 16, No. 22, pp. 1732–1734, (Nov. 15, 1991).

Kashyap, R., "Phase–Matched Periodic Electric–Field–Induced Second–Harmonic Generation in Optical Fibers", J. Opt. Soc. Am. B, vol. 6, No. 3, pp. 313–328, (Mar. 1989).

(List continued on next page.)

*Primary Examiner*—Akm Enayet Ullah
*Assistant Examiner*—Jerry T. Rahll
(74) *Attorney, Agent, or Firm*—Finnegan, Henderson, Farabow, Garrett & Dunner, L.L.P.

(57) ABSTRACT

A method of and apparatus for creating a second order non-linearity profile along a waveguide. The method comprises: thermally poling a waveguide structure to generate a second order non-linearity; placing a mask adjacent to the waveguide structure; and exposing the waveguide structure with UV light through the mask to selectively erase the second order non-linearity along the waveguide structure. The mask may be an amplitude mask or phase mask. In a preferred embodiment an amplitude mask is used in combination with an incoherent UV light source to produce selective erasure of a thermally poled second order non-linearity. Apparatus for carrying out this method and devices based on waveguide structure fabricated using the method are also described.

51 Claims, 18 Drawing Sheets

OTHER PUBLICATIONS

Kashyap, R. et al. "Phase–Matched Second–Harmonic Generation By Periodic Poling of Fused Silica", App. Phys. Lett., vol. 64, No. 11, pp. 1332–1334, (Mar. 14, 1994).

Armstrong, J. A. et al., "Interactions Between Light Waves in a Nonlinear Dielectric", Physical Review, vol. 127, No. 6, pp. 1918–1939, (Sep. 15, 1962).

Pruneri, V. et al., "Frequency Doubling of Picosecond Pulses in Periodically Poled D–Shape Silica Fibre", Electronics Letters, Vo. 33, No. 4, pp. 318–319, (Feb. 13, 1997).

Pruneri, V. et al., "Efficient Frequency Doubling of 1.5$\mu$m Femtosecond Laser Pulses in Quasi–Phase–Matched Optical Fibers", Appl. Phys. Lett., vol. 72, No. 9, pp. 1007–1009, (Mar. 2, 1998).

Pruneri, V. et al., "Greater Than 20%–Effecient Frequency Doubling of 1532–nm Nanosecond Pulses in Quasi–Phase–Matched Germanosilicate Optical Fibers", Optics Letters, vol. 24, No. 4, pp. 208–210, (Feb. 15, 1999).

Scalora, M. et al., "Pulsed Second–Harmonic Generation in Nonlinear, One–Dimensional, Periodic Structures", Physical Review A, vol. 56, No. 4. pp. 3166–3174, (Oct. 1997).

Haus, J. W. et a., "Enhanced Second–Harmonic Generation in Media With a Weak Periodicity", Physical Review A, vol., 57, No. 3, pp. 2120–2128, (Mar. 1998).

Pruneri, V. et al., "Thermal Poling of Silica in Air and Under Vacumm: The Influence of Charge Transport on Second Harmonic Generation", Appl. Phys. Lett., vol. 74, No. 17, pp. 2423–2425, (Apr. 26, 1999).

* cited by examiner

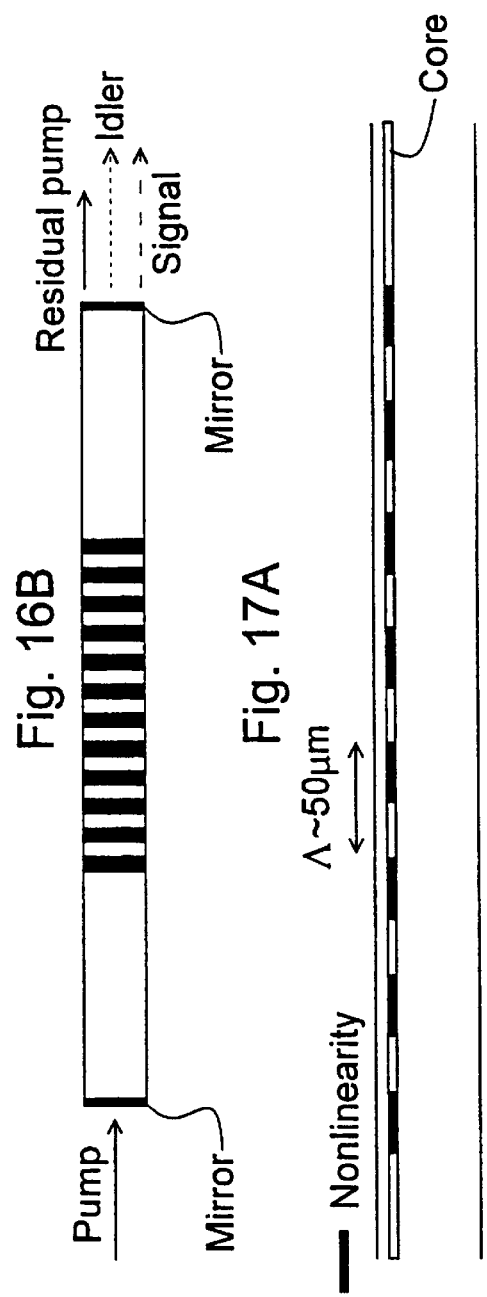
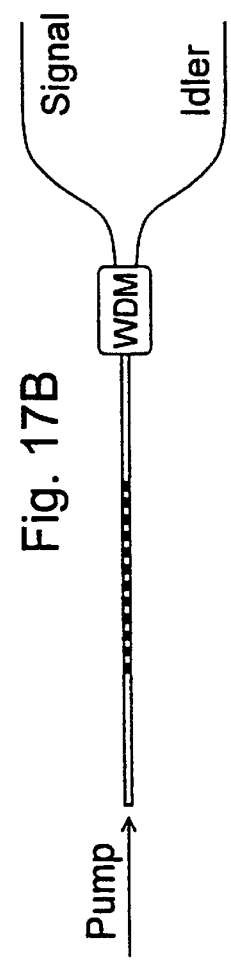
Fig. 16A  Fig. 16B  Fig. 17A  Fig. 17B

PERIODIC OPTICAL POLING OF WAVEGUIDES FOR QUASI PHASE MATCHING

This application is a continuation of PCT/GB00/02839, filed Jul. 21, 2000.

BACKGROUND OF THE INVENTION

The present invention relates to methods and apparatus for inducing a varying second-order non-linearity profile in optical fibres and other waveguides, and to waveguides having such a varying second-order non-linearity profile.

Waveguides with periodically varying second-order non-linearities are of interest, since they can be used to provide quasi-phase matching (QPM). In non-linear glasses, QPM is usually achieved by periodically alternating regions with non-linearity (poled sections) and regions without non-linearity (unpoled sections). In this way the phase-mismatch accumulated in each poled section is reset in the unpoled one (where the absence of the non-linearity prevents back conversion), so that in the next poled section the fields have the right phase relation for constructive growth of the generated signals.

QPM devices have potential applications for optically integrated frequency conversion of coherent light sources, wavelength routing in telecommunication systems, all-optical switching via cascading of second-order non-linearities, parametric fluorescence for quantum applications (such as cryptography and metrology), and high speed modulation.

Since its proposal [1] QPM has been implemented in many materials including lithium niobate, semiconductors and polymers. Several configurations have been employed to achieve efficient second-order non-linear optical interactions. QPM allows one to access new wavelengths and to provide higher efficiency and non-critical interaction geometries. QPM also provides flexibility and new possibilities for phase-matching, especially in materials where the birefringence is not high enough to compensate for the dispersion and where modal phase-matching is not desirable in order to avoid the generation of light in higher order modes.

QPM devices can be fabricated by periodic poling of waveguides. Here and throughout this document the term "periodic poling" is used to mean a varying second-order non-linearity profile, not necessarily of a single frequency. Periodic poling exploits the potential of the QPM technology to extend the possibility of efficient frequency conversion to materials, which are in widespread use in optical applications, such as silica and germanosilicate optical glass. This is advantageous since silica and some other optical glasses exhibit high transparency, are low cost, have high optical damage thresholds, and are straightforward to integrate with optical fibre and planar waveguide-based systems.

Considering all the aforesaid properties, it is natural to consider periodically poled silica fibre (PPSF) and periodically poled silica waveguides (PPSW) as ideal media for a wide range of QPM processes, such as frequency conversion of fibre lasers, difference frequency generation for routing at telecommunication wavelengths, generation of correlated photon pairs via parametric fluorescence for quantum cryptography and avalanche photodiodes characterisation, and cascading of second-order non-linearities to produce equivalent third order effects (self and cross-phase modulation) for all-optical switching. In addition to the above applications which are based on three-wave-mixing (TWM) processes, periodic modulation of a second order non-linearity (hence the electro-optic coefficient) could be exploited to produce high speed travelling wave electro-optic switches.

Compared to more traditional crystal waveguides, PPSF has the drawback of a lower effective non-linear coefficient ($d_{eff}$), but offers the advantages of: (i) a longer interaction length (L) for the same bandwidth (due to a lower dispersion); (ii) higher damage intensity threshold (I); and (iii) lower loss ($\alpha$) and refractive index (n), thus keeping high values for the efficiency-factor ($d_{eff}^2 L^2 I)/(\alpha n^3)$. In particular, the large value of the bandwidth-interaction length product makes PPSF suitable for frequency conversion of short pulses (picosecond and even femtosecond) where low group velocity mismatch between interacting pulses at different frequencies is desirable.

Production of a permanent and large second-order non-linearity in fused silica glass was demonstrated some time ago [2]. However, later initial work on QPM in optical fibres [3] relied on a different process which produced a non-permanent second-order non-linearity. Later work on QPM [4] is based on a permanent and large second-order non-linearity induced in fused silica by a combined thermal and electrical process in which a high voltage is applied between electrodes across a waveguide while the waveguide is maintained at a relatively high temperature. This process which involves elevated temperature is referred to, at least in the present document, as thermal poling. By structuring one of the electrodes, the thermal poling can be selectively induced only in those regions of the waveguide underlying the structured electrode. In this way a varying profile of the second order non-linearity can be induced. This is referred to as periodic thermal poling (PTP), at least in the present document, where it shall be understood that the term "periodic" does not imply that the second order non-linearity profile is necessarily of a single frequency component. More complex profiles (e.g. chirped) are also to be understood to be encompassed by this term.

PTP has been demonstrated in silicate glass bulk [5] and in optical fibre [6] to produce permanently poled structures. The use of planar lithography on a D-shaped fibre to define a patterned electrode for PTP has also been demonstrated [7] and subsequently used for highly-efficient frequency-doubling of femtosecond pulses [8], and for high power fibre sources [9]. A technique for planar lithography has been described [10] and the use of such technique to define periodic structure was suggested, however not supported by any experimental data.

Another method to produce a varying second order non-linearity profile, which is referred to, at least in the present document, as periodic optical poling (POP), is based on ultra-violet (UV) light exposure. It shall be understood that the term "periodic" does not imply that the second order non-linearity profile is necessarily of a single frequency component. More complex profiles are also to be understood to be encompassed by this term. POP methods have been previously described [11], [12] and [13]. In reference [11] POP is performed by thermal poling and subsequent UV erasure using an interference pattern. In references [12] and [13], POP is performed by the simultaneous application of an electric field and exposure to a periodic UV pattern.

One of the advantages of POP over PTP is the possibility of fabricating longer samples. Existing PTP methods rely on direct lithography of a patterned electrode. For single-step lithography, sample length is therefore limited to about 10 cm.

In POP a combination of uniform thermal poling and selective UV erasure can be used. (Here the term uniform thermal poling is used to distinguish from PTP to express the induction of a continuous, substantially constant, second order non-linearity along a waveguide). Neither uniform thermal poling or periodic UV erasure imposes a short length requirement. Uniform thermal poling does not require any electrode patterning, so no masks are needed. Periodic UV erasure can be performed on lengths of up to 1 m with periods of down to about 0.5 µm using techniques developed for fabricating fibre Bragg gratings, i.e. inducing refractive index modulation in photosensitive optical fibre.

It is important to note that for POP it is not necessary to pattern an amplitude mask directly onto the sample, so that the photolithography step is not needed. Therefore another advantage lies in the possibility to use a fibre possessing a geometry closer to standard telecommunication ones (outer diameter ~125 µm), on which the realisation of a periodic electrode by means of standard lithography would be fairly awkward, in particular for short periods.

The typical QPM periods for forward three-wave mixing (i.e. the three interacting waves are propagating in the same direction) in glass-based optical fibres and planar waveguides are between 10 and 100 µm. For backward interaction (one of the waves is propagating in the opposite direction with respect to the other two waves) periods in the range of 0.3–1 µm are desirable. These shorter periods are readily achievable with POP. With PTP, sub-micron lithographic processing would need to be be employed.

Another interesting feature of glass is the possibility of combining linear refractive index and second-order non-linear gratings in the same fibre or planar waveguide device. This offers the possibility of making, for example, a fibre-based fully-integrated optical parametric oscillator where mirror feed-back is provided by a linear Bragg grating and a second-order non-linear grating provides a gain medium. The combination of linear and non-linear grating could also lead to enhanced efficiency [14, 15].

SUMMARY OF THE INVENTION

According to one aspect of the invention there is provided a method of creating a second order non-linearity profile along a waveguide, comprising: thermally poling a waveguide structure to generate a second order non-linearity; placing a mask adjacent to the waveguide structure; and exposing the waveguide structure with UV light through the mask to selectively erase the second order non-linearity along the waveguide structure. The mask may be an amplitude mask or a phase mask.

According to another aspect of the invention there is provided an apparatus for selectively erasing thermal poling, comprising: a sample holder for mounting a thermally poled waveguide structure; a mask removably held in fixed relation to the sample holder; and a UV light source arranged to illuminate a thermally poled waveguide structure mounted in the sample holder through the mask.

Further aspects of the invention relate to waveguide structures and optical devices made according to the method and apparatus of the above aspects of the invention.

In the following detailed description, waveguide geometry considerations are discussed in detail. For example, the importance of the distance between electrodes during thermal poling is discussed in the light of the mechanism of depletion region formation and the measurements on fused silica bulk samples.

It is also described how a large fibre diameter and/or a fibre with one or more internal holes can be advantageously used to avoid electrical breakdown during thermal poling and provide the possibility for thermal poling in air and other non-vacuum conditions.

Furthermore, it is described how POP can be used for fabricating longer non-linear gratings using amplitude masks and the realisation of shorter periods using phase masks. Short periods are suitable for backward interactions and for highly dispersive materials.

The methods described also allow the realisation of complex combinations of linear and non-linear structures.

The varying second-order non-linearity profiles realisable with embodiments of the invention can be used to fabricate various devices. In the case of three wave mixing processes, the profile allows compensation of the phase-mismatch between the interacting waves and the corresponding non-linear driving polarisation (i.e. QPM). A waveguide structure and poling conditions are used which maximise the overlap between the interacting waves and the poled region, the efficiency of the interaction being proportional to the degree of overlap.

In an illustrative embodiment of the invention periodically poled D-shaped germanosilicate fibres are fabricated using uniform thermal poling and a photolithographically defined electrode that is used as an amplitude mask for subsequent selective UV erasure. The use of uniform pre-etching is also discussed for preparing the sample prior to deposition of the photolithographically defined electrode. The results of three wave mixing experiments (including frequency doubling) carried out using the fabricated samples are then presented.

Other novel aspects and advantages of the present invention may become apparent upon reading the following illustrative description and upon reference to the drawings.

BRIEF DESCRIPTION OF THE DRAWINGS

FIG. 16A Longitudinal section through a forward-interaction optical parametric oscillator device.

FIG. 16B Schematic of the device of FIG. 16A showing the second order non-linearity modulation and the light signals.

FIG. 17A Longitudinal section through a forward-interaction photon pair generator device.

FIG. 17B Schematic of the device of FIG. 17A showing the second order non-linearity modulation and the light signals and wavelength division multiplexer (WDM) coupler.

DETAILED DESCRIPTION

A first embodiment of the invention relates to a fabrication method and apparatus developed for POP of D-shaped germanosilicate optical fibres.

For the first embodiment, the wavelength of interest is 1.5 µm, and the non-linear process considered is forward three-wave mixing. Poling periods ranging between about 10 to 100 µm are therefore needed.

The method of the first embodiment starts from a D-shaped germanosilicate fibre with numerical aperture of ~0.19, core diameter of ~6 µm, outer diameter of ~300 µm and initial flat surface/core distance of 13 µm. The outer diameter is about twice that of common fibres, thus allowing better photolithographic processing and lower breakdown probability during thermal poling.

Figure 1:
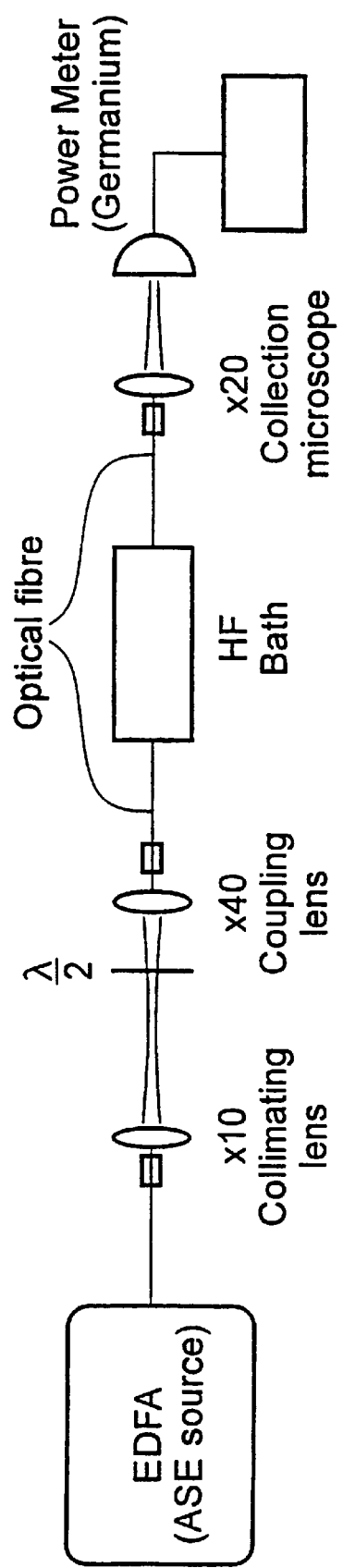
FIG. 1 Set-up for in-situ measurement of transmission loss during uniform etching of D-shaped fibre.

The D-shaped fibre was first etched uniformly using the apparatus sketched in FIG. 1 which allows to control in real time the transmission at around 1.5 µm while the fibre is placed in a HF buffered solution (etching rate of ~0.1 µm/min).

Figure 2:
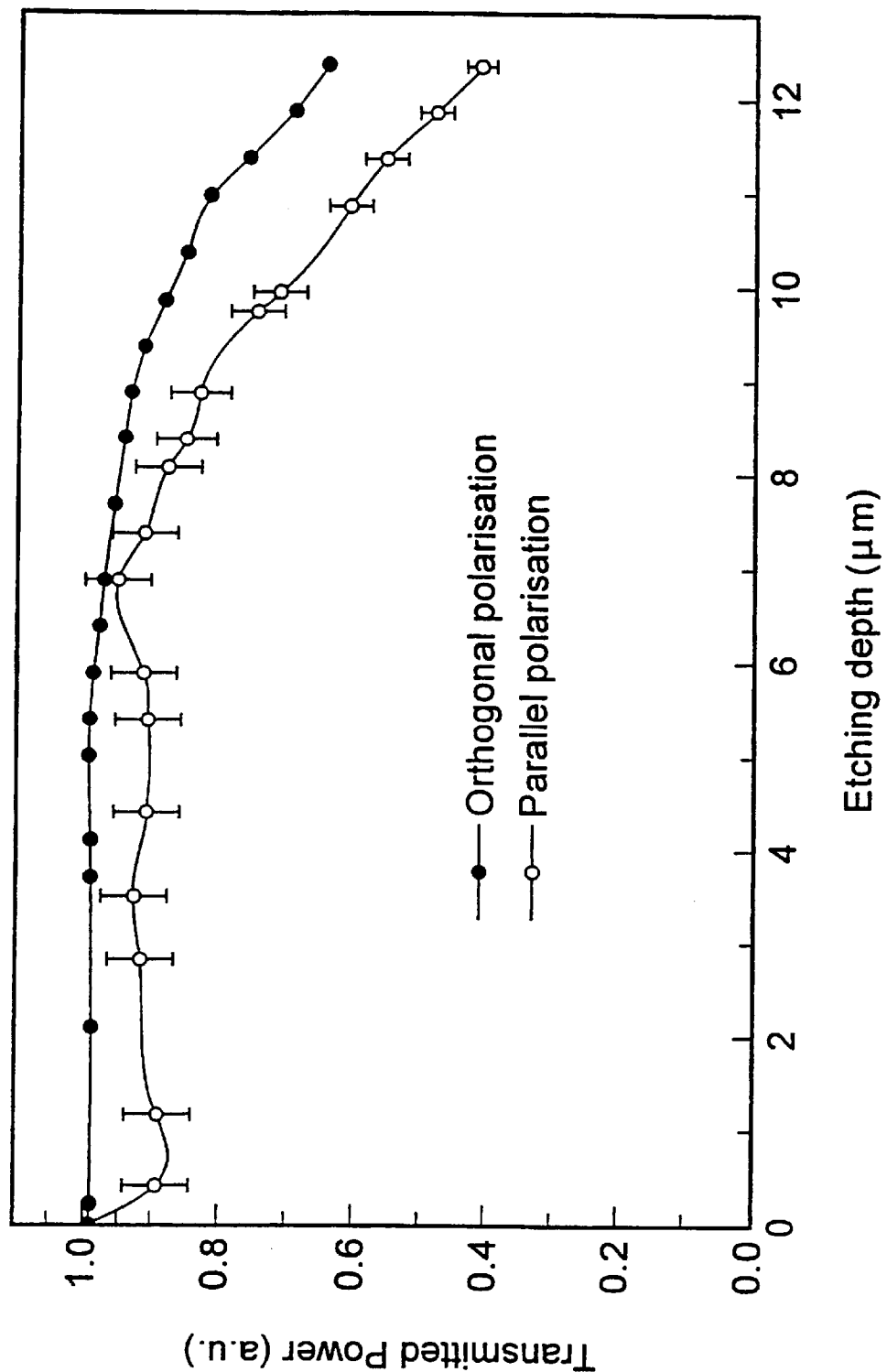
FIG. 2 Power transmission at 1.5 µm against etching depth.

FIG. 2 shows the transmission of the fibre against the etching depth. The etching is stopped when the transmission starts decreasing, so that the flat surface/core distance is about 5 µm. This distance is, on the one hand, sufficiently small that the core region is within range of the subsequent thermal poling induced by a surface electrode, while, on the other hand, sufficiently large to avoid significantly increased optical propagation losses in the waveguide.

After the above-described uniform etching to reduce the flat surface/core distance to about 5 µm, an Al electrode is evaporated onto the flat side of the D-shaped fibre, i.e. the surface corresponding to the straight upright of the "D".

Figure 3:
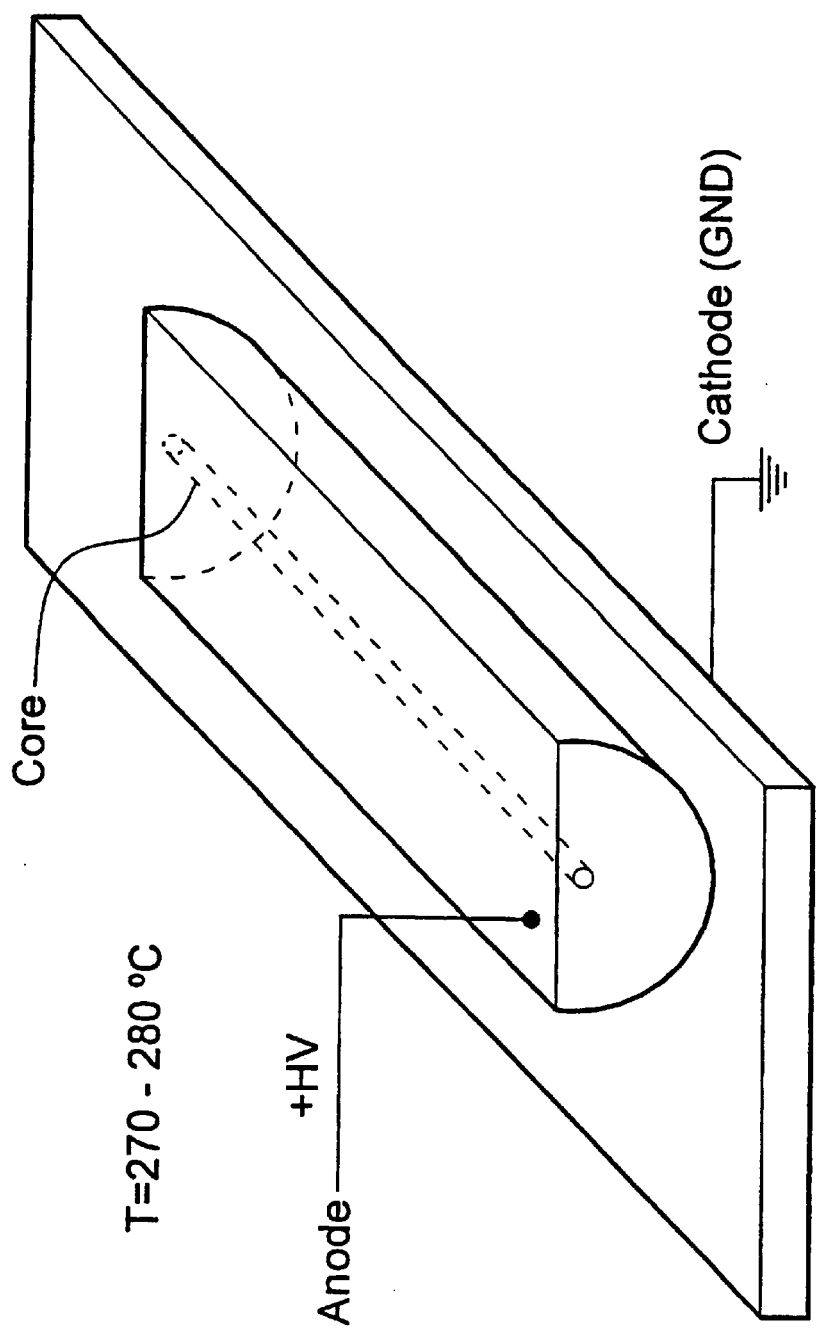
FIG. 3 Poling under vacuum of D-fibre. The anode (positive) is the flat surface electrode and a Si wafer is the cathode (grounded), placed under the curved face. During thermal poling the sample is subjected to 3–5 kV at around 270–280° C.

FIG. 3 shows the next step in which the sample is uniformly thermally poled in a high vacuum atmosphere of a vacuum chamber. Thermal poling was performed by applying 3–5 kV voltage at 270–280° C. for 10–20 minutes. The Al electrode on the flat surface of the D-shaped fibre was the positive electrode during poling (anode) while a silicon wafer placed under the curved face was used as the grounded electrode (cathode). The vacuum atmosphere reduces the probability of breakdown, which would certainly occur in air when these voltages are used over such a small electrodes gap.

Figure 4:
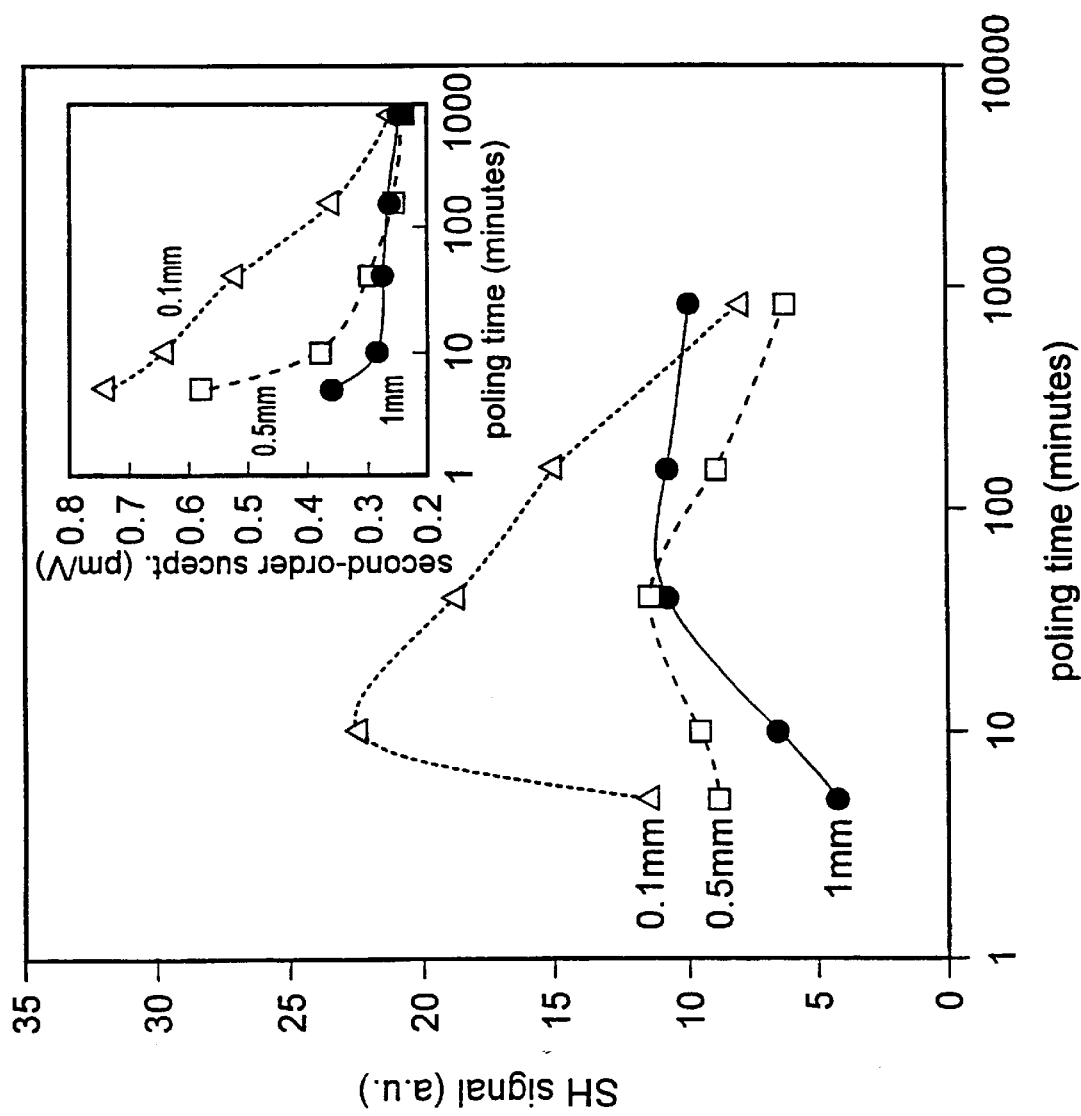
FIG. 4 Second harmonic (SH) signal from thermally poled samples versus poling time for three different sample thicknesses. Poling conditions (4 kV, 290° C.). Inset: non-linear susceptibility against poling time.

FIG. 4 shows the SH signal (and the value of the non-linear susceptibility in the inset) as a function of thermal poling time, obtained using a Q-switched and mode-locked Nd:YAG laser, for fused silica samples after thermal poling in air for different sample thickness. The smaller the samples thickness the higher the value of the non-linearity, a clear indication that part of the voltage during the thermal poling process drops across the undepleted (not poled) sample region. It seems convenient to reduce the electrodes distance during poling, so that the non-linearity is increased. However it has to be pointed out that to form an efficient depletion layer (where most of the voltage drops and is stored in the material when the sample is cooled down to room temperatures) is necessary to have a material thickness (hence the electrode distance) greater than the depletion layer thickness. For example in vacuum the depletion layer thickness (which corresponds to the thickness of the non-linearity) is already ~10–20 µm even for short poling times [16], therefore the electrode distance in any fibre and waveguide structure for thermal poling in vacuum should probably be in the range of 50–100 µm for the temperature and voltage conditions used in these studies. The optimum material thickness for thermal poling is also likely to be dependent on material composition (for example the germanosilicate fibre is made of layers with different proportion of $GeO_2$ and $SiO_2$) and poling conditions (atmosphere, poling temperature and voltage, etc.). For example for thermal poling in air atmosphere the minimum material thickness (electrode distance) could be smaller that that required for thermal poling in vacuum given the fact that the evolution of the depletion layer in air is slower [16]. These results show that the distance between the electrodes (anode and cathode), i.e. the thickness of the material subjected to the poling process, is an important parameter for the thermal poling process which needs careful consideration.

Figure 5:
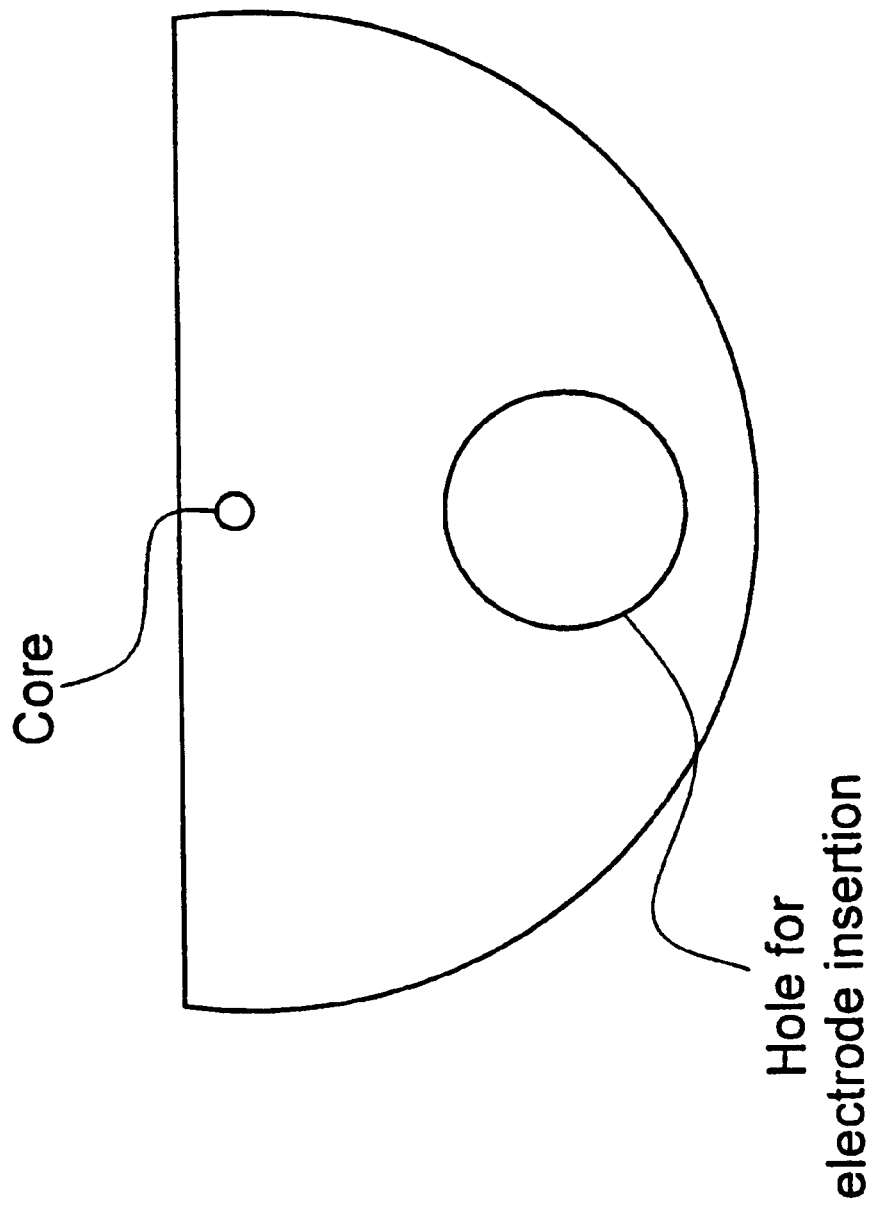
FIG. 5 D-fibre transverse section with internal hole for metal wire insertion.

FIG. 5 shows in cross-section a different fibre geometry for thermal poling, alternative to that of FIG. 3. In this alternative geometry, the D-shaped fibre is provided with a hole for electrode insertion placed along the two-fold symmetry axis of the D-shaped fibre between the core and the curved surface of the "D". A metal wire of gold plated tungsten is inserted into the hole of the fibre and is used as the cathode during thermal poling. The anode electrode is fabricated on the flat surface of the "D" as described above. In this way electrical breakdown problems during thermal poling are avoided without needing to provide a high vacuum atmosphere. By contrast, when a planar "pressed contact" cathode is used in contact with the round face of the D-fibre (see FIG. 3), breakdown can only be avoided by thermal poling in high vacuum. The embedded electrode structure reduces effectively the breakdown probability because any conductive path between the two electrodes has to be mainly through the bulk of the material. The thermal poling of this type of fibre has a much higher reliability. For example higher voltages can be applied without encountering breakdown problems. The fibre has been tested for SHG and produced promising results. In principle this fibre could be poled in air.

The uniformly thermally poled D-shaped fibre is then ready for the second main stage in the process, the UV exposure through a mask held in proximity to the fibre for the controlled selective erasure of the thermally poled second-order non-linearities along the sections of the waveguide not covered by the mask.

Figure 6:
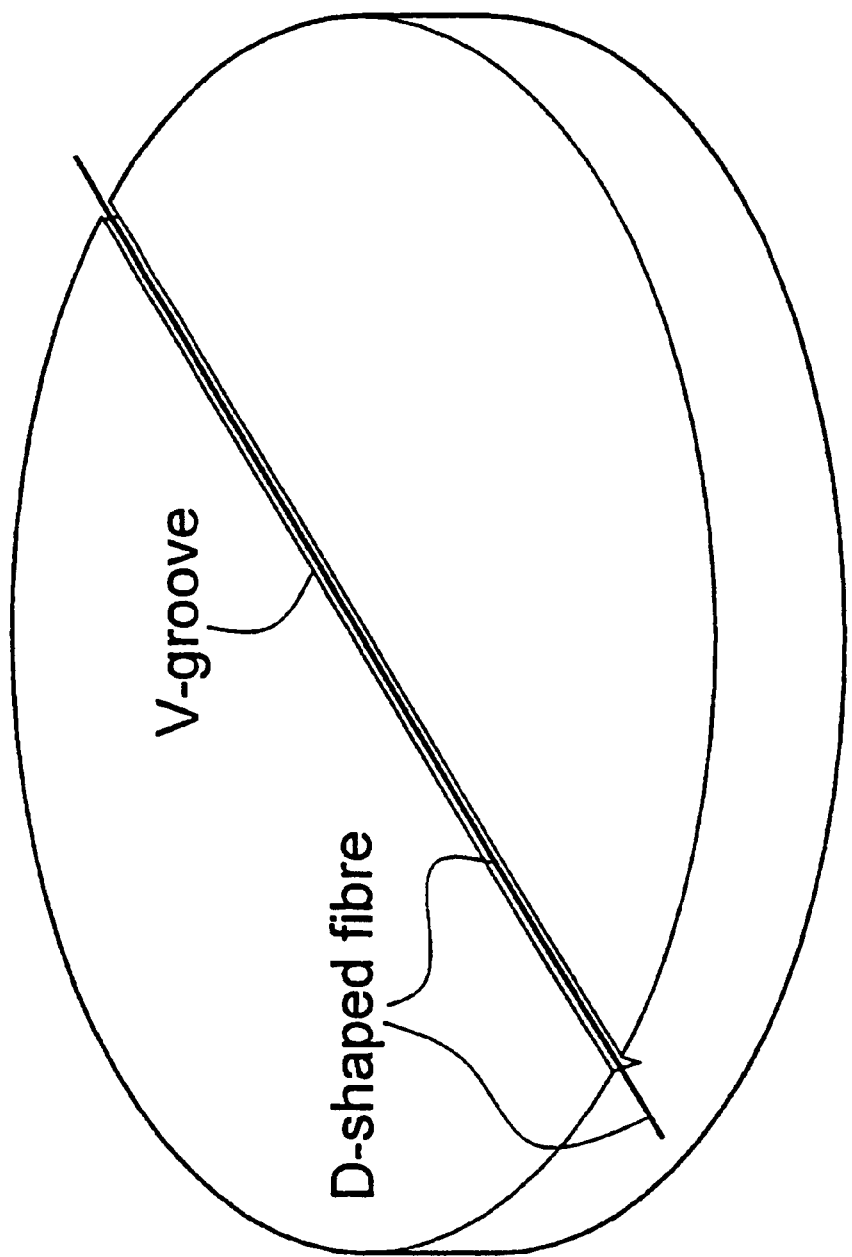
FIG. 6 D-shaped fibre sample positioned in a V-groove in preparation for planar lithographic processing.

First, the uniform Al electrode previously deposited was patterned in order to obtain an amplitude mask for the UV exposure. To perform this step, the fibre is placed on a metal substrate with V-groove (FIG. 6) and taped at the ends (or alternatively glued) for standard planar lithography.

Figure 7B:
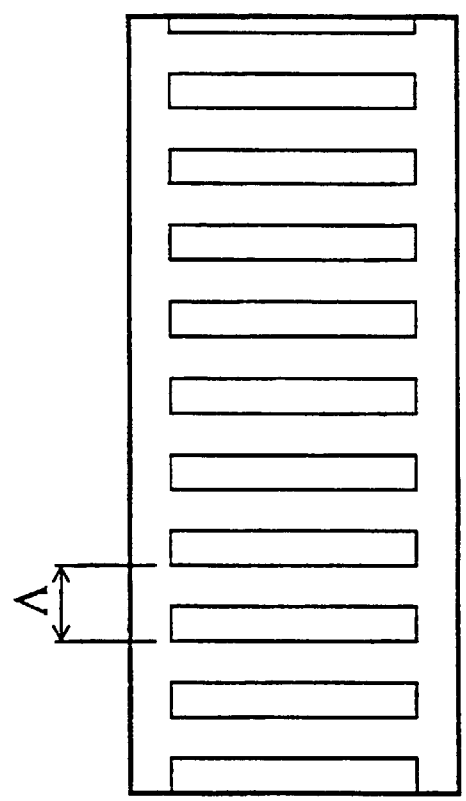
FIG. 7B Plan view of D-fibre of FIG. 7A showing the plane face of the D-fibre with patterned electrode.
Figure 7A:
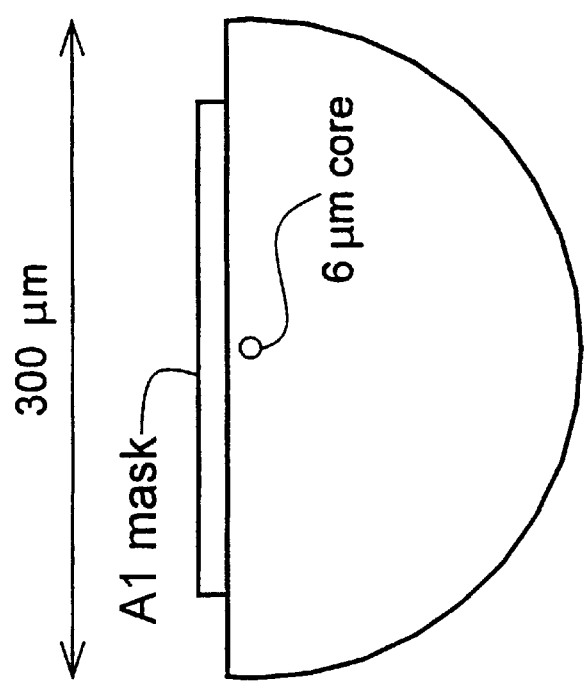
FIG. 7A Cross-section of D-fibre used in the QPM experiments at 1.5 µm showing an Al patterned electrode photo-lithographically defined on its plane face. The Al patterned electrode is fabricated on the plane face of the D-shaped fibre using standard planar lithography.

FIG. 7A shows a cross-section of the D-shaped fibre after formation of the Al pattern on the flat surface of the "D".

FIG. 7B shows a plan view of the same structure. In two examples, electrode periods (which depend on fibre NA and core diameter) of $\Lambda=56.45$ and $56.5$ $\mu$m were chosen for QPM frequency doubling within the range 1530–1540 nm.

The sample was then subjected to UV exposure through the Al electrode which is thus acting as an amplitude mask. The UV radiation was provided in early experiments by a mercury lamp supplied by UVP Limited, Cambridge UK—trade name "Pen-Ray". Later experiments used a deuterium UV lamp which mainly emits below 200 nm and produced improved results. The coupling optics used with this lamp were made of $MgF_2$ ensuring that operation down to 120 nm is provided. The dramatically improved results achieved with the deuterium lamp are believed to be largely attributable to the fact that the UV erasure process in the optical glass appears much more sensitive to UV radiation below 200 nm, specifically in the range 120–200 nm, more especially 170–200 nm. This surprising enhanced sensitivity effect is observed with silica glass as well as the germanosilicate glass of the optical fibre used in the present embodiment. The sensitivity means that very low powers are sufficient for the POP. As a consequence, large areas can be processed without the need for high power sources, such as high-power UV lasers, which are not inexpensive.

As an alternative to UV lamps, it is clear that a UV laser or other well-collimated UV source could be used to provide a better defined non-linear modulation by creating a straight-through (more rectangular-like) light pattern.

In addition, rather than an amplitude mask directly created on the flat surface, an external amplitude mask could be used. A key advantage of amplitude masks is that they are ideal for use in conjunction with non-coherent sources, such as the UV lamps of the present embodiment. The UV light pattern could however also be formed using a phase mask placed in proximity to the waveguide. However in that case a coherent light source would be required and the advantages of using a UV lamp would be lost.

Figure 8:
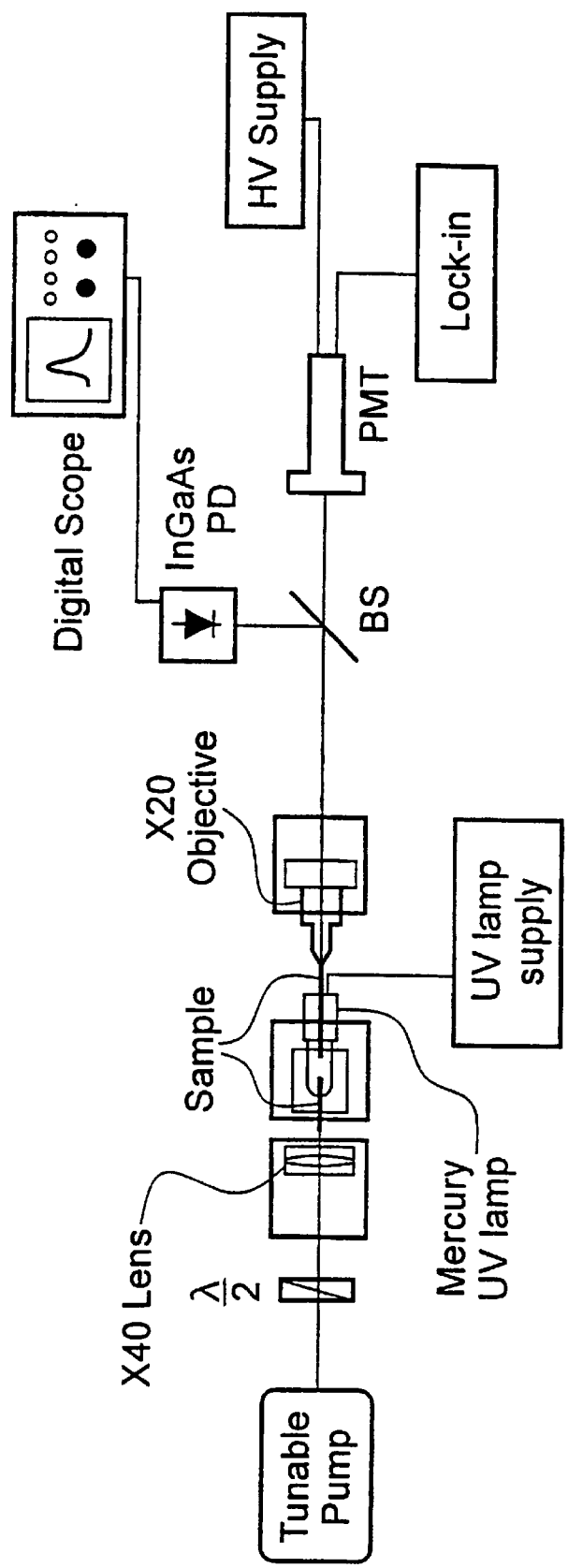
FIG. 8 Set-up for periodic UV erasure of a uniformly poled D-shaped fibre.

FIG. 8 shows the experimental set-up for the UV exposure.

Figure 9:
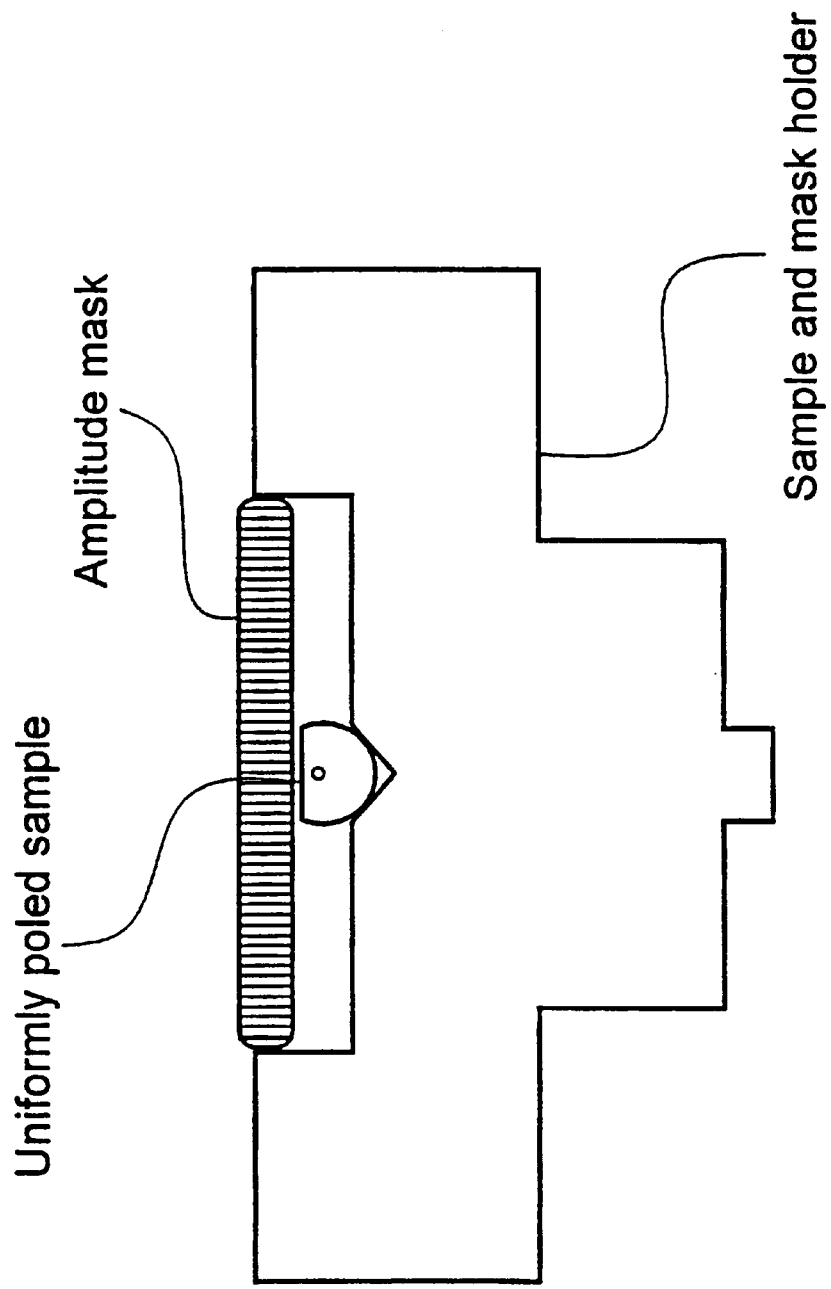
FIG. 9 D-shaped fibre sample positioned in a V-groove in preparation for UV exposure through a separate amplitude mask removably held adjacent to the flat surface of the D-shaped fibre.

FIG. 9 shows schematically in cross-section the apparatus used for the UV erasure. A sample and mask holder is provided. The thermally poled D-shaped fibre is held in a V-groove. An amplitude mask is then held above the D-shaped fibre in position for illumination with UV light, thereby to generate the desired second order non-linearity profile in the fibre.

Figure 10:
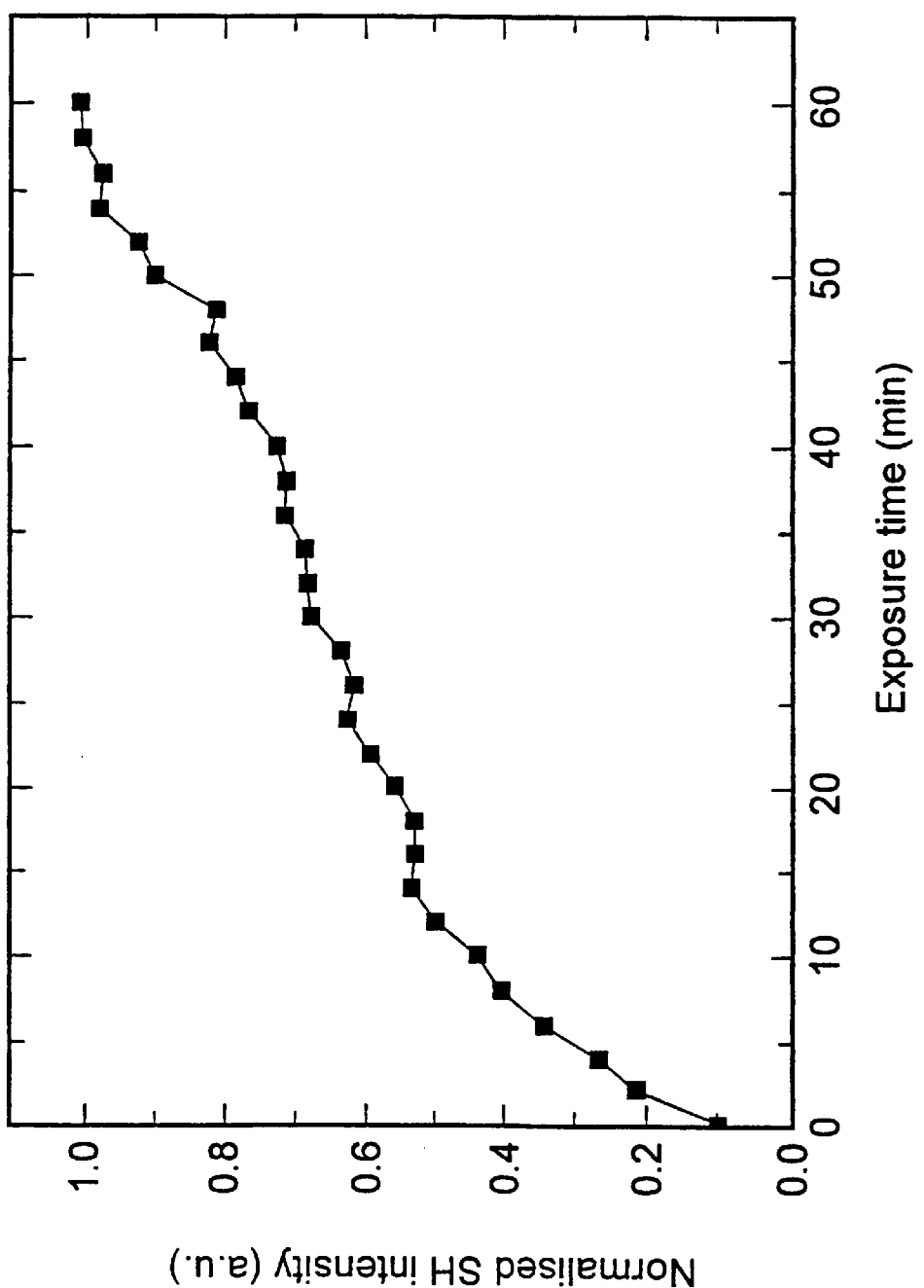
FIG. 10 Growth of a SH signal during exposure to a periodic UV light pattern for a first sample: grating (period=56.45 µm, length=6 cm) in D-shaped fibre (NA=0.19 and core diameter=6 µm).

FIG. 10 is a graph shows results for a first sample which was exposed using the above-mentioned mercury lamp. The graph shows the growth of the QPM second harmonic (SH) signal in real time during the UV erasure. The SH signal growth is plotted in arbitrary units against UV exposure time in minutes. The results were measured by detecting the frequency doubled light at the QPM peak using as fundamental source a quasi-continuous-wave Er-doped fibre amplifier tuneable in the range of 1525–1555 nm. The initial signal is not phase-matched and is produced in several SH waveguided modes, whereas the growth in the SH signal is associated to the QPM signal in the fundamental mode.

Figure 11:
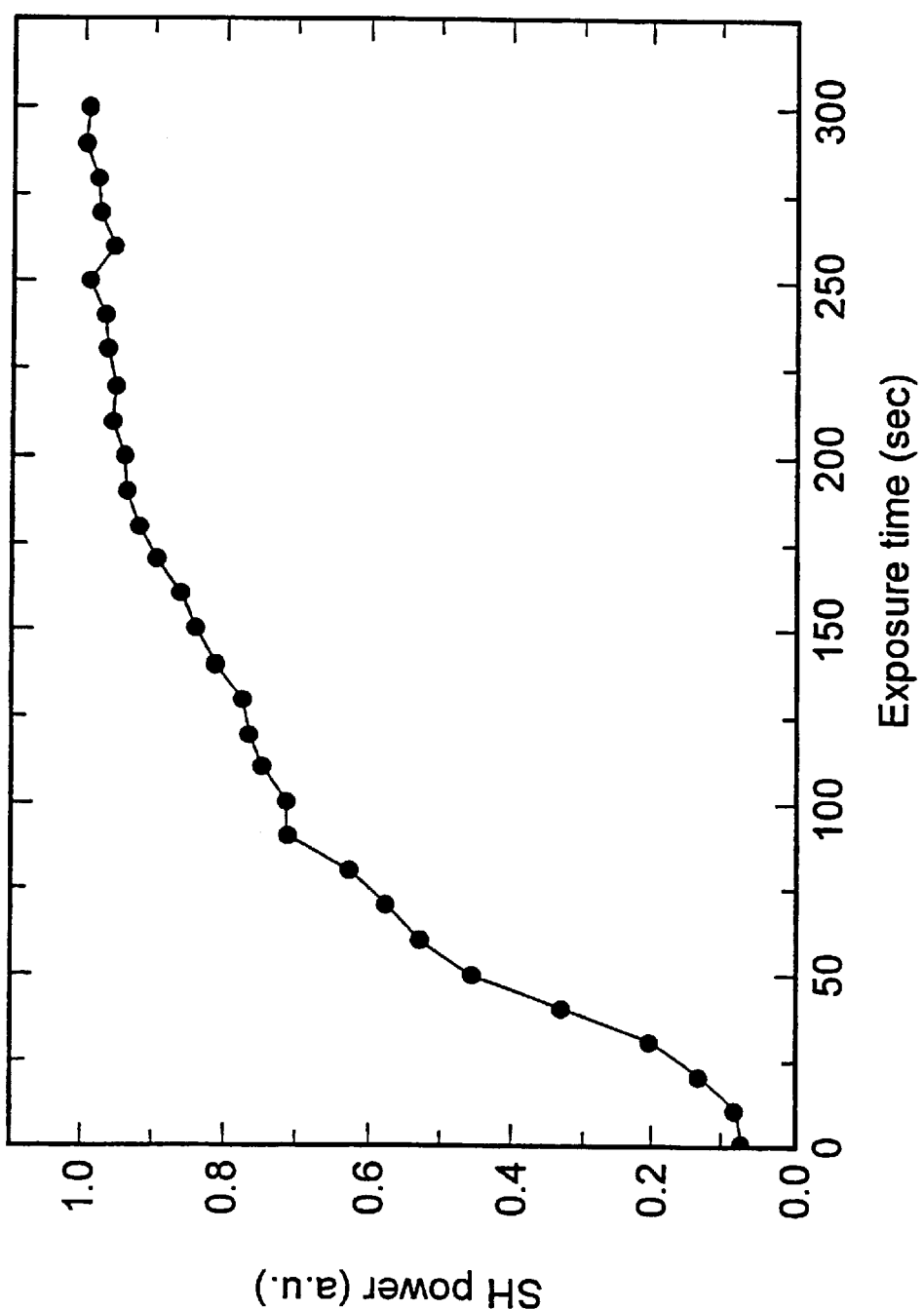
FIG. 11 Growth of the SH signal during exposure to a periodic UV light pattern for a second sample.

FIG. 11 shows similar results to FIG. 10 for a second sample which was exposed using the above-mentioned deuterium lamp. SH signal build-up is however much more rapid, taking place in a scale of seconds rather than minutes. This demonstrates the above-described enhanced sensitivity provided by the deuterium lamp.

Figure 12:
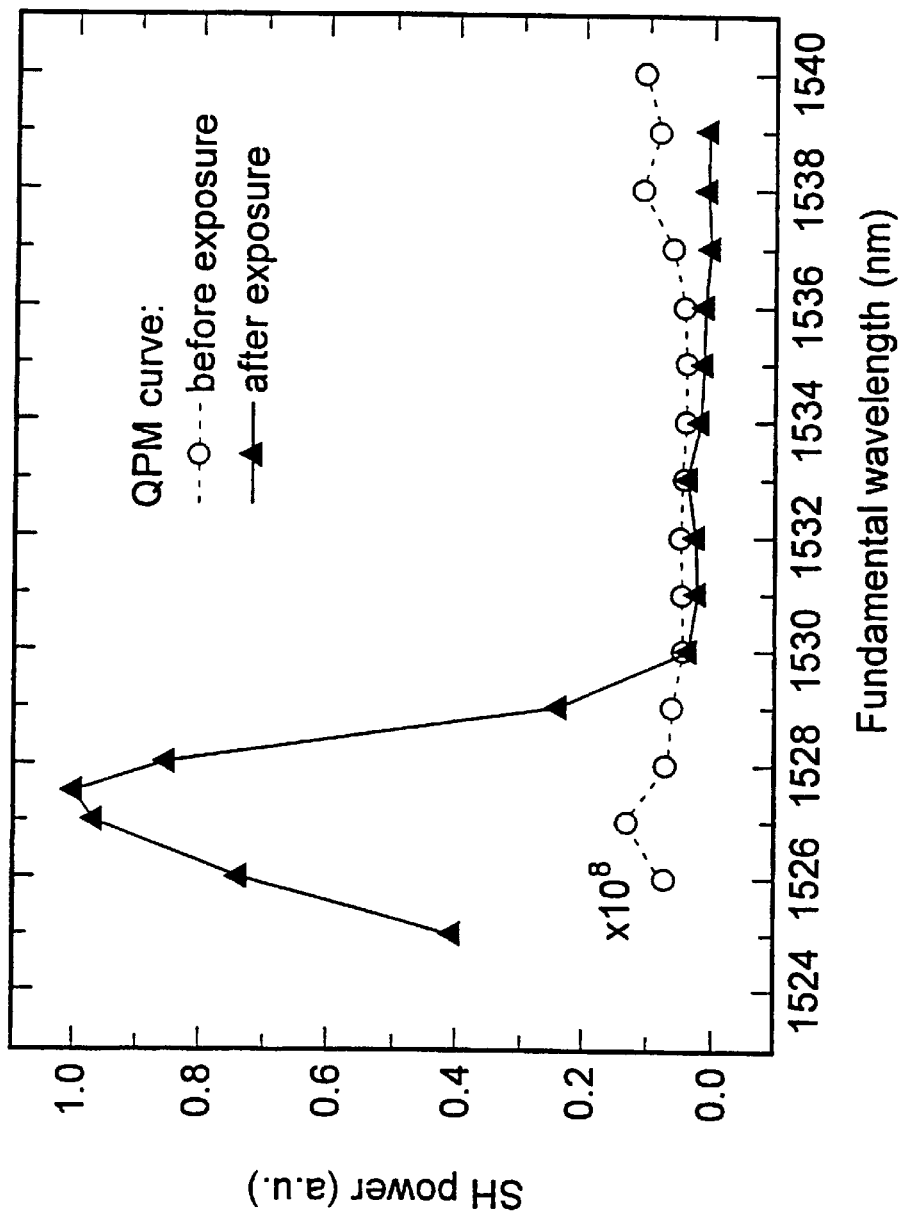
FIG. 12 QPM performance data for the second sample of FIG. 11 before and after selective UV exposure.

FIG. 12 shows QPM performance data for the second sample of FIG. 11 before and after selective UV exposure. After exposure a well defined peak at around 1528 nm is evident. This is to compare with a predicted peak from the QPM period of 1532 nm, calculated from a poling period of 56.46 microns. The slight discrepancy may be attributable to small variations in the core dimensions.

The method and apparatus of the first embodiment can be modified for general application to other glass materials and compositions, fibre types and waveguide geometries. The method and apparatus of the first embodiment can be modified to fabricate other periods (for example shorter periods for backward interaction or for more dispersive glass materials) and to fabricate more complex structures with advanced phase-matching properties (e.g. chirped structures). Generally phase masks will be used in place of amplitude masks for very short period structures where fabrication of a suitable amplitude mask becomes problematic.

Figure 13:
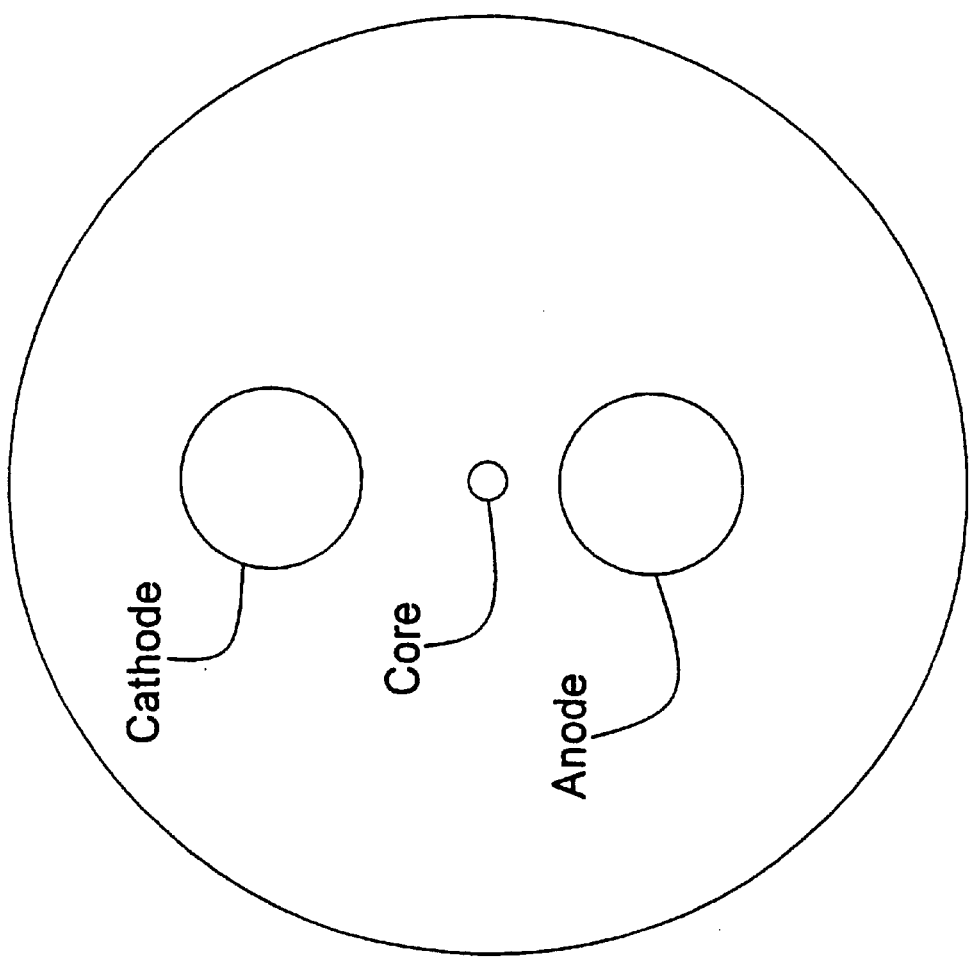
FIG. 13 Circular-section fibre in transverse section with two internal holes for metal wire insertion.

FIG. 13 shows in cross-section an alternative fibre geometry for thermal poling, alternative to that shown in FIG. 5, which is suitable for use in conjunction with a separate mask such as a separate phase mask or the separate amplitude mask of the embodiment of FIG. 9. In this alternative fibre geometry, a circular section fibre is provided with two holes for electrode insertion. The holes for receiving the embedded electrodes are placed on opposite sides of the core of the fibre. Metal wires (gold plated W) are inserted into the holes and are used as the anode and cathode during thermal poling. The anode is beneficially placed closer to the core than the cathode, as indicated. In this way similar advantages to those described with reference to FIG. 5 can be gained.

Some device design considerations are now discussed. Typically the grating periods required to phase-match the second-order parametric interactions are in the range of tens of microns forward interactions. This, very importantly, enables one to use amplitude masks, either directly fabricated on the flat surface of a D-shape fibre or in proximity contact, to create the UV pattern. In this case a non-coherent UV low-power short-wavelength UV lamp can be used as source, thus making the whole fabrication process very simple.

Longer gratings can be obtained simply by using a stitching technique, whereby a given section of the uniformly poled fibre is exposed. The fibre is then carefully translated by an appropriate amount and a new section exposed and so on, in order to achieve a continuous periodic structure of the desired length. Methods and apparatus from writing fibre Bragg gratings in photosensitive fibre can be used. Because of the much longer periods of 10 microns or more, none of the stitching problems associated with the 500 nm period refractive index modulated structures arise. Long non-linear gratings can exhibit large efficiency for second-order optical parametric processes, which can be exploited for the implementation of frequency conversion devices for telecommunications systems or for the generation of photon-pairs and twin beams. The special characteristics of twin beams, based on the quantum properties of photons, make them useful for example for quantum key distribution systems and for the characterisation of photon counting modules.

The above-described methods can also be used to create non-linear structures of much shorter period suitable to quasi-phase match backward parametric interactions, in which the pump and the generated beams counter-propagate. In this case, due to the short periods required, a phase mask, rather than an amplitude mask, will be necessary to achieve the desired UV pattern. One example of application of backward interaction is to implement a mirrorless optical parametric oscillator.

Some devices using POP structures fabricated according to the above described methods are now described.

Figure 14A:
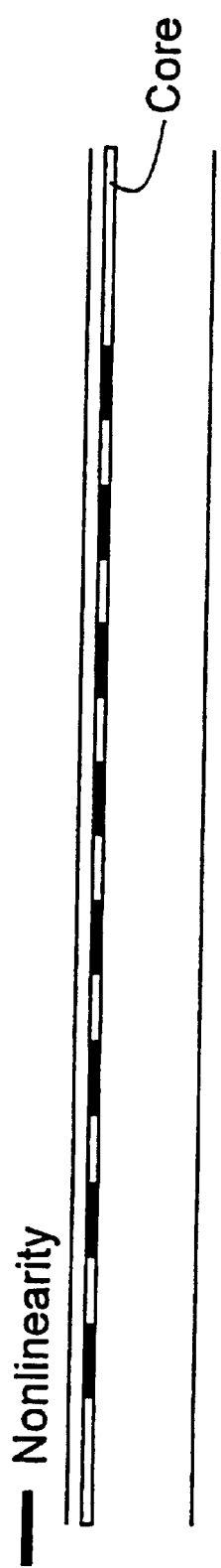
FIG. 14A Longitudinal section through a backward-interaction three-wave-mixing device.
Figure 14B:
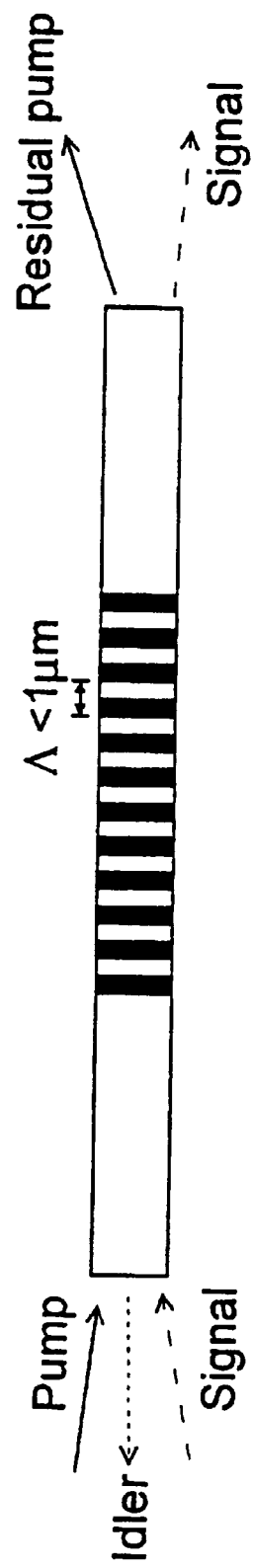
FIG. 14B Schematic of the device of FIG. 14A showing the second order non-linearity modulation and the light signals.

FIG. 14A and FIG. 14B show a Backward-Three-Wave-Mixing (BTWM) fibre device that provides a transparent and effective frequency converter, which would be largely employed in Wavelength-Division-Multiplexing (WDM) optical telecommunication systems.

The pump beam interacting with the non-linear fibre and with the incoming signal, produces a backward travelling idler which carries the same modulation as the signal at a different wavelength such that:

$$\omega_i + \omega_s = \omega_p \qquad (1)$$

where $\omega_i$, $\omega_s$, $\omega_p$ are used to denote idler, signal and pump frequency respectively. At the same time the signal wave is also amplified. The phase-matching condition is provided by the use of a periodic non-linearity achieved in the core by means of the above-described POP methods. The advantage of BTWM consists in the separation between the signal and the idler and pump, which occurs naturally due to the very physical mechanism of the phenomenon. A wavelength converter based on such device would not therefore require any further optical filtering to separate the desired wavelength (idler) from the residual ones (pump and signal).

Another application of BTWM is for the implementation of mirror-less optical parametric oscillators, where the optical feedback required in order to start the oscillation is provided by the backward propagation of the waves inside the non-linear fibre.

In any case a device based on BTWM typically requires a periodicity of the non-linear grating $\Lambda < 1$ μm, in order to compensate for the large momentum mismatch between the counter-propagating waves.

Figure 15A:
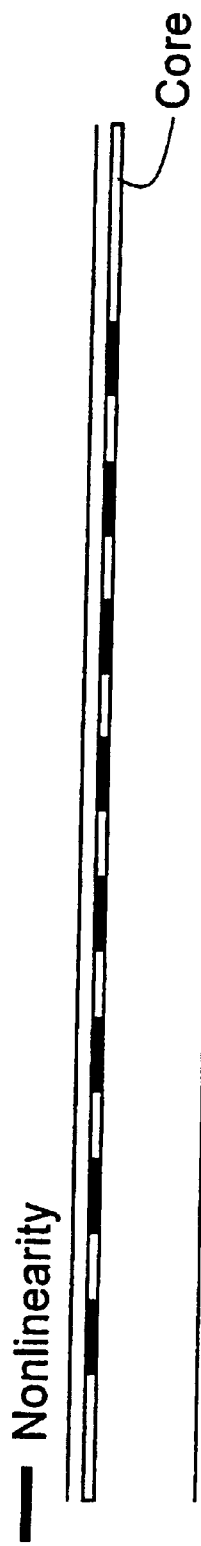
FIG. 15A Longitudinal section through a forward-interaction three-wave-mixing device.
Figure 15B:
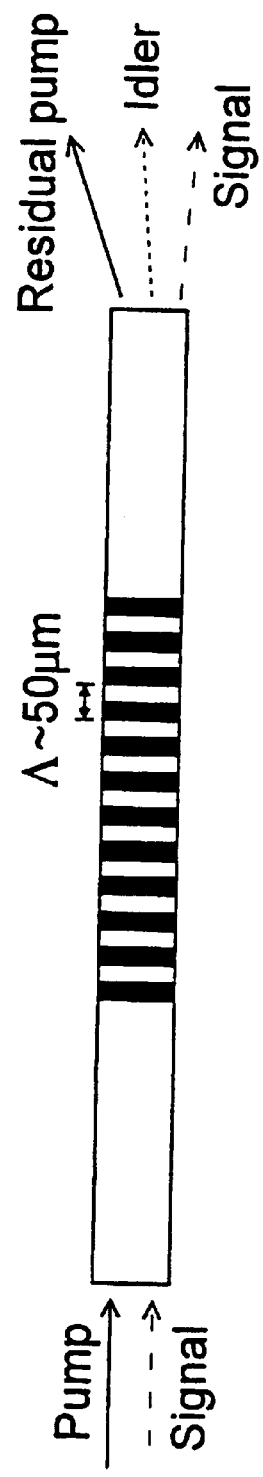
FIG. 15B Schematic of the device of FIG. 15A showing the second order non-linearity modulation and the light signals.

FIG. 15A and FIG. 15B show a Forward-Three-Wave-Mixing (FTWM) fibre device, similarly to the one described above based on BTWM. The illustrated FTWM device provides a transparent and effective frequency converter, which would be largely employed in Wavelength-Division-Multiplexing (WDM) optical telecommunication systems.

The pump beam interacting with the non-linear fibre and with the incoming signal, produces a forward travelling idler which carries the same modulation as the signal at a different wavelength such that:

$$\omega_i + \omega_s = \omega_p$$

where $\omega_i$, $\omega_s$, $\omega_p$ denote idler, signal and pump frequency respectively. At the same time the signal wave is also amplified. The phase-matching condition is provided by the use of a periodic non-linearity achieved in the core by means of the above-described POP methods. The advantage of FTWM consists in the use of non-linear gratings possessing a period of tens of microns, however due to the co-propagating nature of the waves involved, optical filtering is necessary to separate idler from signal and to suppress the residual pump signal.

FIG. 16A and FIG. 16B show another device, namely an optical parametric oscillator. Similar to BTWM based devices, FTWM can be used to implement optical parametric oscillators (OPOs). However suitable optical feedback must be provided by means of mirrors that can be external or directly fabricated onto the polished ends of the non-linear fibre or by means of Bragg gratings directly fabricated in the sample. OPOs find large use as sources of coherent radiation possessing a very broad tuneability range, which find useful application for example in spectroscopy, material and laser science.

FIG. 17A and FIG. 17B show another device. This device is a photon-pair generator based around a fibre possessing periodic second-order non-linearity is a particular case of TWM. Here a forward configuration is considered. The pump enters the fibre device and interacting with the non-linear medium provides amplification for the photons originated by quantum noise. Each pump photon is then split into two photons, according to equation (1) above. The two photons represent a pair and possess special correlation properties, which exhibit non-local behaviour. This can be exploited for example in fibre-based quantum key distribution system where the photon pair generator would represent the light source.

Figure 18A:
FIG. 18A Longitudinal section through a forward-interaction second harmonic generator (SHG) device.
Figure 18B:
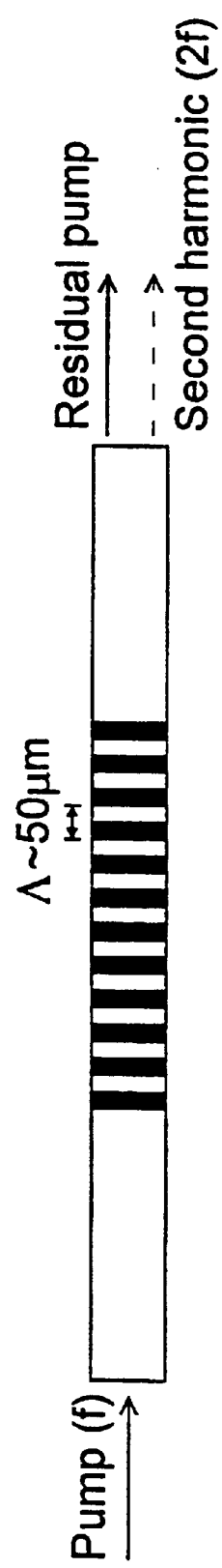
FIG. 18B Schematic of the device of FIG. 18A showing the second order non-linearity modulation and the light signals.

FIG. 18A and FIG. 18B show another device, namely a second harmonic generator. This device is another case of TWM (here considered forward). The pump beam at frequency f self-beats to produce a second harmonic beam at frequency 2f. SH generation is useful to generate new wavelengths by doubling the output of readily available powerful lasers, in particular fibre lasers. A fibre second harmonic generator would be straightforward to integrate with existing high power fibre lasers/amplifiers, by means of direct splicing or micro-optics coupling.

Figure 19:
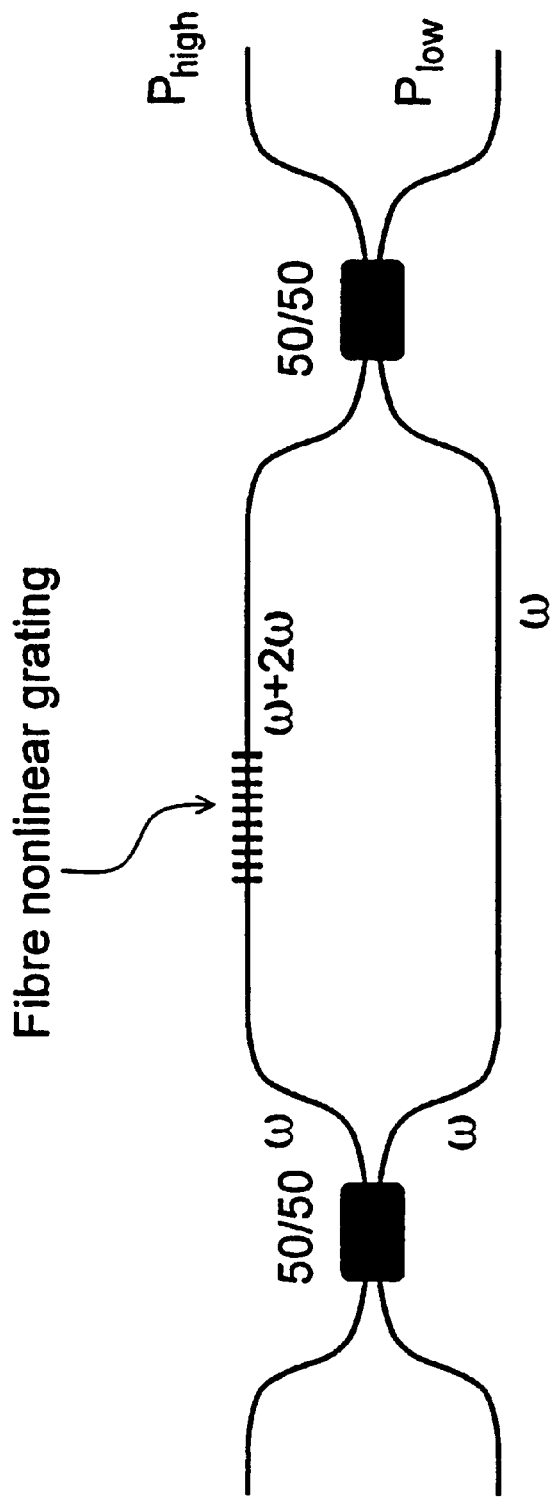
FIG. 19 Schematic of a power dependent switch device.

FIG. 19 shows another device which is a power dependent optical switch. In this device the non-linearity is cascaded, by which it is meant the pump at frequency $\omega$ is frequency doubled and then converted back to $\omega$. In this process, the pump wave acquires a phase shift, which is power dependent and that can be used in combination with an interferometer, e.g. Mach-Zehnder, in order to implement a power dependent switch. If the power is high the signal will exit port $P_{high}$, otherwise $P_{low}$. An optical fibre possessing periodic second order non-linearity would allow the implementation of a fully fiberised version of such a device, thus improving its integratability with existing fibre optics networks.

SUMMARY

The foregoing illustrative description of embodiments of the invention describes methods of inducing a periodic non-linearity in an optically transmissive material such as an optical fibre. The method comprises using a uniform electrode to apply a uniform field at high temperature and performing periodic erasure of the induced uniform non-linearity by exposing the material to UV light.

The foregoing illustrative description also describes embodiments of the invention comprising optical fibres and waveguides having the reduced periodic non-linearities.

The foregoing illustrative description also describes embodiments of the invention comprising apparatus for inducing the periodic non-linearties in optical fibres and waveguides.

REFERENCES

1. J. A. Armstrong, N. Bloembergen, J. Ducuing, and P. S. Pershan, *'Interactions between light waves in a non-linear dielectric'*, Physical Review 127, 1918 (1962)
2. R. A. Myers, N. Mukherjee, and S. R. J. Brueck, *'Large second-order non-linearity in poled fused silica'*, Optics Lett. 16, 1732 (1991)
3. R. Kashyap, *'Phase-matched periodic electric-field-induced second-harmonic generation in optical fibres'*, J. Opt. Soc. Am. B 6, 313 (1989)
4. R. A. Myers, N. Mukherjee, and S. R. J. Brueck, *'Large second-order non-linearity in poled fused silica'*, Optics Lett. 16, 1732 (1991)
5. R. Kashyap, G. J. Veldhuis, D. C. Rogers, and P. F. McKee, *'Phase-Matched second-harmonic generation by periodic poling of fused silica'*, Appl. Phys. Lett. 64, 1332 (1994)
6. P. G. Kazansky, V. Pruneri and P. St. J. Russell, *'Blue-light generation by quasi-phase-matched frequency doubling in thermally poled optical fibres'*, Optics Lett. 20, 843 (1995)
7. V. Pruneri and P. G. Kazansky *'Frequency doubling of picosecond pulses in periodically poled D-shape silica fibre'*, Electronics Lett. 33, 318 (1997)
8. V. Pruneri, G. Bonfrate, P. G. Kazansky, C. Simonneau, P. Vidakovic, and J. A. Levenson, *'Efficient frequency doubling of 1.5 μm fetmosecond laser pulses in quasi-phase-matched optical fibre'*, Applied Phys. Lett. 72, 1007 (1998)
9. V. Pruneri, G. Bonfrate, P. G. Kazansky, D. J. Richardson, N. G. Broderick, C. Simonneau, P. Vidakovic, J. A. Levenson, *'>20%-efficient frequency doubling of 1532 nm nanosecond pulses in quasi-phase-matched germanosilicate optical fibres'*, Optics Lett. 24, 208 (1999)
10. U.S. Pat. No. 5,617,499: S. R. J. Brueck, X. C. Long *'Technique for fabrication of a poled electro-optic fiber segment'*
11. U.S. Pat. No. 5,247,601: R. A. Myers, N. Mukherjee, and S. R. J. Brueck, *'Arrangement for producing large second-order optical non-linearities in a waveguide structure including amorphous $SiO_2$'*
12. WO 96/16344: T. Fujiwara, S. Fleming, M. Sceats, and S. Poole *'Inducing or enhancing electro-optical properties in optically transmissive material'*
13. WO 98/07064: T. Fujiwara et al. *'Grating element, light wavelength selection utilizing the same, and optical signal transmitting system'*
14. M. Scalora et al., *'Pulsed second-harmonic generation in non-linear, one-dimensional, periodic structures'*, Physical Review A 56, 3166 (1997)
15. J. W. Haus et al., *'Enhanced second-harmonic generation in media with a weak periodicity'*, Physical Review A 57, 2120 (1998)
16. V. Pruneri, F. Samoggia, G. Bonfrate, P. G. Kazansky, and G. M. Yang, Applied Phys. Lett. 74, 2423 (1999)

What is claimed is:

1. A method of creating a second order non-linearity profile along a waveguide, comprising:

thermally poling a waveguide structure to generate a second order non-linearity;

placing an amplitude mask adjacent to the waveguide structure; and exposing the waveguide structure with incoherent UV light through the amplitude mask to selectively erase the second order non-linearity along the waveguide structure.

2. A method according to claim 1, wherein the waveguide structure has a substantially flat surface along which the amplitude mask is arranged.

3. A method according to claim 2, wherein the amplitude mask comprises a patterned structure formed on the substantially flat surface, the patterned structure being opaque to the incoherent UV light.

4. A method according to claim 2, wherein the amplitude mask comprises a separate mask removably held adjacent to the substantially flat surface of the waveguide structure.

5. A method according to claim 2, wherein the waveguide structure is a planar waveguide.

6. A method according to claim 2, wherein the waveguide structure is a D-shaped optical fibre with the substantially flat surface being formed by the straight upright of the "D".

7. A method according to claim 1, wherein the incoherent UV light is generated by a UV lamp.

8. A method according to claim 7, wherein the UV lamp is a mercury lamp.

9. A method according to claim 7, wherein the UV lamp is a deuterium lamp.

10. A method according to claim 1, wherein the UV light has a wavelength component of less than 200 nanometers.

11. A method according to claim 1 wherein the step of thermally poling is performed by applying a voltage between an anode and a cathode, at least one of the anode and cathode comprising an electrode embedded within the waveguide structure.

12. A waveguide fabricated according to the method of claim 1.

13. An apparatus for creating a second order non-linear profile along a waveguide comprising:

a sample holder for mounting a thermally poled waveguide structure to generate a second order nonlinearity;

an amplitude mask removably held in fixed relation to the sample holder and adjacent to the thermally poled waveguide structure; and an incoherent UV light source arranged to illuminate the thermally poled waveguide structure through the amplitude mask to selectively erase the second order non-linearity.

14. An apparatus according to claim 13, wherein the UV light source is a UV lamp.

15. An apparatus according to claim 14, wherein the UV lamp is a deuterium lamp.

16. An apparatus according to claim 14, wherein the UV lamp is a mercury lamp.

17. An apparatus according to claim 13, wherein the UV light source has a wavelength component of less than 200 nanometers.

18. A waveguide having sections of second order non-linearity generated by thermal poling interspersed with sections where second order non-linearity has been erased by UV exposure with incoherent UV light through an amplitude mask.

19. An optical device utilizing forward three-wave mixing by quasi phase matching comprising a waveguide according to claim 18.

20. An optical device utilizing backward three-wave mixing by quasi phase matching comprising a waveguide according to claim 18.

21. An optical parametric oscillator comprising an optical device according to claim 19 or 20.

22. A photon pair generator comprising an optical device according to claim 19 or 20.

23. A second harmonic generator comprising an optical device according to claim 19 or 20.

24. A power dependent switch comprising an optical device according to claim 19 or 20.

25. A method of creating a second order non-linearity profile along a waveguide, comprising:
thermally poling a waveguide structure to generate a second order non-linearity;
placing a mask adjacent to the waveguide structure; and
exposing the waveguide structure with UV light having a wavelength component of less than 200 nanometers through the mask to selectively erase the second order non-linearity along the waveguide structure.

26. A method according to claim 25, wherein the mask is an amplitude mask and the waveguide structure has a substantially flat surface along which the amplitude mask is arranged.

27. A method according to claim 26, wherein the amplitude mask comprises a patterned structure formed on the substantially flat surface, the patterned structure being opaque to the UV light.

28. A method according to claim 26, wherein the amplitude mask comprises a separate mask removably held adjacent to the substantially flat surface of the waveguide structure.

29. A method according to claim 26, wherein the amplitude mask is exposed with UV light that is incoherent.

30. A method according to claim 29, wherein the UV light is generated by a UV lamp.

31. A method according to claim 30, wherein the UV lamp is a mercury lamp.

32. A method according to claim 30, wherein the UV lamp is a deuterium lamp.

33. A method according to claim 26, wherein the waveguide structure is a O-shaped optical fibre with the substantially flat surface being formed by the straight upright of the "D".

34. A method according to claim 26, wherein the waveguide structure is a planar waveguide.

35. A method according to according to claim 25, wherein the mask is a phase mask removably held adjacent to the waveguide structure.

36. A method according to claim 25, wherein the step of thermally poling is performed by applying a voltage between an anode and a cathode, at least one of the anode and cathode comprising an electrode embedded within the waveguide structure.

37. A waveguide fabricated according to the method of claim 25.

38. An apparatus for creating a second order non-linear profile along a waveguide comprising:
a sample holder for mounting a thermally poled waveguide structure to generate a second order non-linearity;
a mask removably held in fixed relation to the sample holder and adjacent to the thermally poled waveguide structure; and
an UV light source having a wavelength component less than 200 nanometers and arranged to illuminate the thermally poled waveguide structure through the mask to selectively erase the second order non-linearity.

39. An apparatus according to claim 38, wherein the mask is an amplitude mask.

40. An apparatus according to claim 39, wherein the UV light source is a source of incoherent UV light.

41. An apparatus according to claim 40, wherein the UV light source is a UV lamp.

42. An apparatus according to claim 41, wherein the UV lamp is a mercury lamp.

43. An apparatus according to claim 40, wherein the UV lamp is a deuterium lamp.

44. An apparatus according to claim 38, wherein the mask is a phase mask and the UV light source is a source of coherent light.

45. A waveguide having sections of second order non-linearity generated by thermal poling interspersed with sections where second order non-linearity has been erased by UV exposure with UV light having a wavelength component of less than 200 nanometers through a mask.

46. An optical device utilizing forward three-wave mixing by quasi phase matching comprising a waveguide according to claim 45.

47. An optical device utilizing backward three-wave mixing by quasi phase matching comprising a waveguide according to claim 45.

48. An optical parametric oscillator comprising an optical device according to claim 46 or 47.

49. A photon pair generator comprising an optical device according to claim 46 or 47.

50. A second harmonic generator comprising an optical device according to claim 46 or 47.

51. A power dependent switch comprising an optical device according to claim 46 or 47.

* * * * *

UNITED STATES PATENT AND TRADEMARK OFFICE
CERTIFICATE OF CORRECTION

PATENT NO.   : 6,751,386 B2
DATED        : June 15, 2004
INVENTOR(S)  : Gabriele Bonfrate et al.

It is certified that error appears in the above-identified patent and that said Letters Patent is hereby corrected as shown below:

Column 13,
Line 40, "O-shaped" should read -- D-shaped --.
Line 45, delete second instance of "according to".

Signed and Sealed this

Twelfth Day of October, 2004

JON W. DUDAS
*Director of the United States Patent and Trademark Office*